(12) United States Patent
Seguro et al.

(10) Patent No.: US 7,877,242 B2
(45) Date of Patent: Jan. 25, 2011

(54) COMPUTER BASED CAE FSI MODELS FOR SIMULATING THE PHYSICAL BEHAVIOR OF DIAPERS, DIAPER MATERIALS, AND/OR DIAPER MACHINES DURING DIAPER MANUFACTURING PROCESSES

(75) Inventors: Jean Vittorio Seguro, Cincinnati, OH (US); Pamela Marie Snyder, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 507 days.

(21) Appl. No.: 11/959,986

(22) Filed: Dec. 19, 2007

(65) Prior Publication Data
US 2009/0164036 A1    Jun. 25, 2009

(51) Int. Cl.
G06F 17/50    (2006.01)
G06F 1/00    (2006.01)

(52) U.S. Cl. .............................. 703/2; 703/9; 700/131; 702/33; 702/51; 702/55; 324/303; 604/392

(58) Field of Classification Search ...................... 703/2, 703/7–9; 604/385.28, 392; 156/82; 158/290; 700/97, 131; 702/33, 51, 55; 324/303
See application file for complete search history.

(56) References Cited

U.S. PATENT DOCUMENTS 7,099,734 B2    8/2006    Pieper et al.
7,569,041 B2 *  8/2009    Stupperich et al. .......... 604/392
2004/0236455 A1  11/2004  Woltman et al.
2004/0236457 A1  11/2004  Stabelfeldt et al.
2004/0236552 A1  11/2004  Pieper et al.
2005/0256686 A1  11/2005  Stabelfeldt et al.

FOREIGN PATENT DOCUMENTS

EP    1621167    1/2006

OTHER PUBLICATIONS

Parallel finite element methods for modeling contact in geometrically nonlinear membrane structures; Xu, Zhenlong (Ph.D); Accorsi, Michael L. (adviser); Dissertation Abstracts International (2002), vol. 63, No. 8B, p. 3835. (2 pages).
Mechanis of Thin, Flexible, Translating Media and Their Interactions with Surrounding Air; Muftu, S.; JSME International Journal, Series C (Mechanical Systems, Machine Elements and Manufacturing) Sep. 2005, vol. 48, No. 3, p. 329-336.
Computer Modeling of Woven Fabrics; Toney, M.; Skelton J.; The Fiber Society, A Joint International Conference with: The Textile Institute, Institute of Materials (UK,F), ENSITM-Mulhouse (F), Institut Textile de France (F), Spring 1997 Joint Conference,: 177+, 3 pages (Apr. 21-24, 1997).
U.S. Appl. No. 11/504,993, filed Aug. 16, 2006, Mel Allende-Blanco, et al.
U.S. Appl. No. 11/504,992, filed Aug. 16, 2006, Mel Allende-Blanco, et al.
U.S. Appl. No. 11/699,880, filed Jan. 30, 2007, Matthew Joseph Macura, et al.

* cited by examiner

*Primary Examiner*—Thai Phan
(74) *Attorney, Agent, or Firm*—Charles R. Ware

(57) ABSTRACT

Computer based CAE FSI models for simulating the physical behavior of diapers, and/or diaper materials, and/or diaper machines during diaper manufacturing processes.

22 Claims, 11 Drawing Sheets

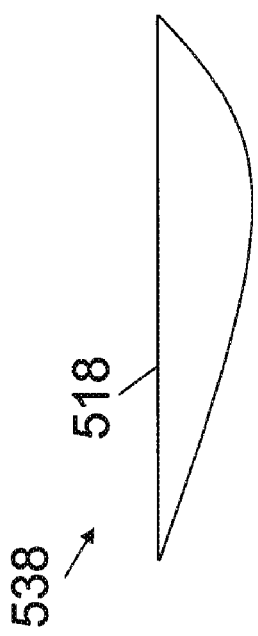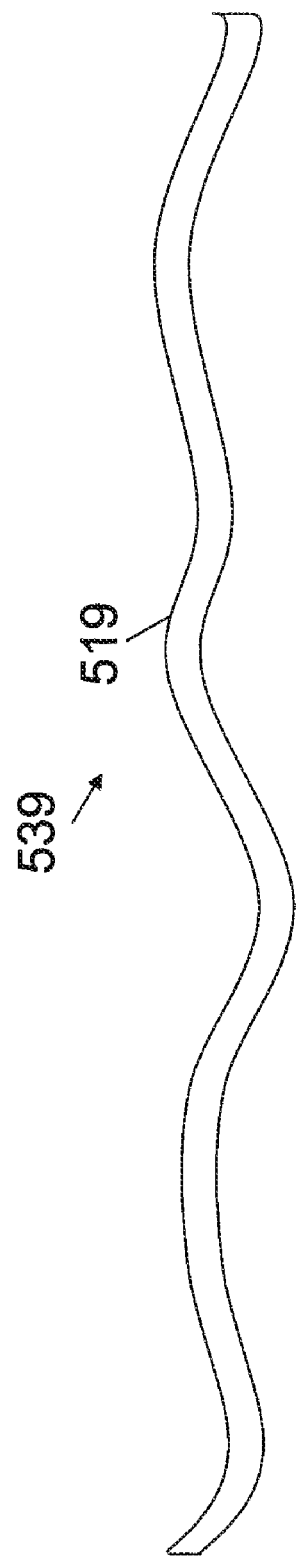
Fig. 5A
Fig. 5B

COMPUTER BASED CAE FSI MODELS FOR SIMULATING THE PHYSICAL BEHAVIOR OF DIAPERS, DIAPER MATERIALS, AND/OR DIAPER MACHINES DURING DIAPER MANUFACTURING PROCESSES

FIELD

In general, embodiments of the present disclosure relate to computer based models for disposable articles. In particular, embodiments of the present disclosure relate to computer based CAE FSI models for simulating the physical behavior of diapers, diaper materials, and/or diaper machines during diaper manufacturing processes.

BACKGROUND

Diaper machines can use diaper materials to manufacture diapers. During diaper manufacturing processes, the diaper materials can interact with the diaper machines and with surrounding air. It can be difficult to predict the physical behavior of the diaper materials as they interact with the diaper machines and with the surrounding air. As a result, it can be difficult to predict whether or not a particular diaper machine design can successfully process a particular configuration of a diaper or diaper materials.

SUMMARY

However, embodiments of the present disclosure can at least assist in predicting whether or not a particular diaper machine design can successfully process a particular configuration of a diaper or diaper materials. The present disclosure includes methods of simulating the physical behavior of one or more diapers and/or diaper materials interacting with diaper machines and moving through surrounding air. As a result, particular diaper machine designs and particular configurations of diapers and/or diaper materials can be evaluated and modified as computer based models before they are tested as real world things.

BRIEF DESCRIPTION OF THE DRAWINGS

FIG. 5A is a plan view illustrating a computer based model of an exemplary discrete piece of diaper trim material.

FIG. 5B is a plan view illustrating a computer based model of an exemplary portion of a continuous piece of diaper trim material.

DETAILED DESCRIPTION

Figure 1A:
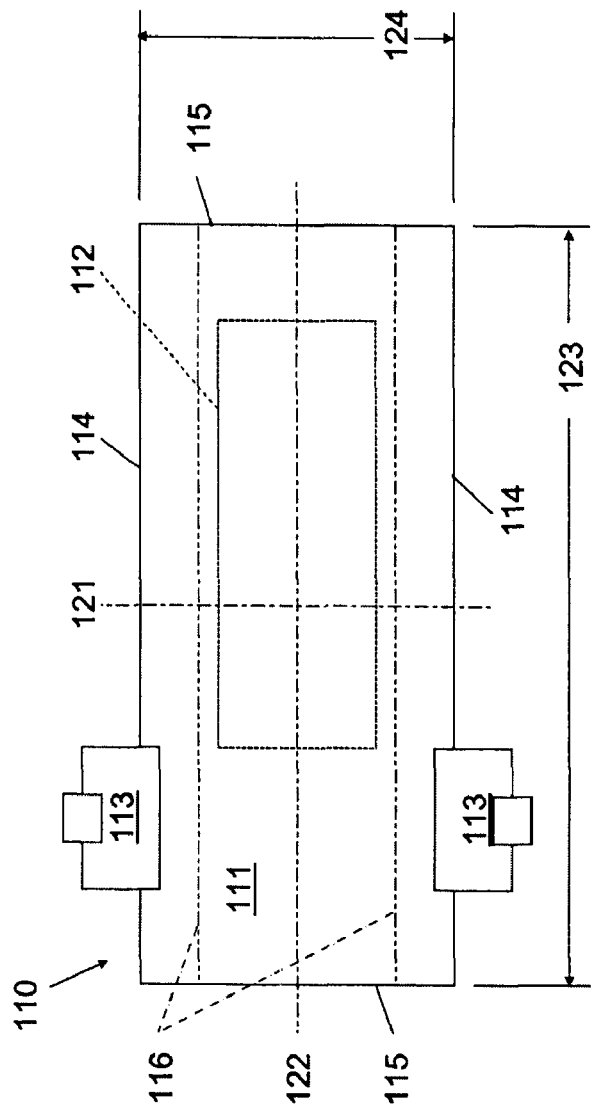
FIG. 1A is an outside plan view illustrating an exemplary diaper laid out flat.

The present disclosure includes methods of simulating the physical behavior of one or more diapers and/or diaper materials interacting with diaper machines and moving through surrounding air. Embodiments of the present disclosure can at least assist in predicting whether or not a particular diaper machine design can successfully process a particular configuration of a diaper and/or diaper materials. As a result, particular diaper machine designs and particular configurations of diapers and/or diaper materials can be evaluated and modified as computer based models before they are tested as real world things.

Computer aided engineering (CAE) is a broad area of applied science in which technologists use software to develop computer based models of real world things. The models can be used to provide various information about the physical behavior of those real world things, under certain conditions and/or over particular periods of time. With CAE, the interactions of the computer based models are referred to as simulations. Sometimes the real world things are referred to as a problem and the computer based model is referred to as a solution.

There are several major categories of CAE. Finite element analysis (FEA) is a major category of CAE, in which models of mechanical components and/or assemblies are used to predict stress, strain and other mechanical behaviors. Computation fluid dynamics (CFD) is another major CAE category, in which models of fluids (e.g. liquids and/or gases) are used to predict pressure, flow, temperature, and other fluid and/or thermal properties. Still another major category of CAE is fluid structure interaction (FSI), which models the physical behavior of fluids in relation to solid objects. There are also a number of other categories of CAE.

Some aspects of CAE can also relate to various Computer Aided technologies, sometimes collectively referred to as CAx. CAx includes a number of technologies, such as Computer Aided Design (CAD), Computer Aided Manufacturing (CAM), and Knowledge Based Engineering (KBE).

Commercially available software can be used to conduct CAE. Abaqus, from SIMULIA in Providence, R.I., and LSDyna from Livermore Software Technology Corp. in Livermore, Calif., are examples of commercially available FEA software. Fluent, from ANSYS, Inc. in Canonsburg, Pa., and Flow3D, from Flow Science, Inc. in Santa Fe, N. Mex. are examples of commercially available CED software. LSDyna is also an example of FSI software. CAE software can be run on various computer hardware, such as a personal computer, a minicomputer, a cluster of computers, a mainframe. a supercomputer, or any other kind of machine on which program instructions can execute to perform CAE.

CAE software can be applied to a number of real world things, such as disposable articles. The term disposable articles includes diapers, feminine hygiene products, and other disposable articles.

A diaper can be referred to in various alternate ways. As examples, a diaper can sometimes be referred to as an absorbent article, absorbent briefs, an absorbent product, an absorbent item, an absorbent garment, an absorbent pant, an absorbent panty, an absorbent undergarment, absorbent underwear, a wearable absorbent article, a disposable absorbent article, a disposable wearable absorbent article, incontinence briefs, an incontinence garment, an incontinence napkin, incontinence pants, an incontinence product, an incontinence towel, an incontinence undergarment, a nappy, a napkin, a pant, pants, a disposable pant, disposable pants, a training pant, training pants, a pull-up, pull-ups, etc. A diaper can be configured for use by various human wearers, such as infants and incontinent persons. Throughout the present disclosure, the terms diaper and diapers are intended to refer to one or more of any of these and all other forms of a diaper, unless otherwise stated.

CAE software can also be applied to diaper materials. Throughout the present disclosure, the terms diaper material and diaper materials are intended to refer to one or more diapers in any state of formation, from one or more starting materials, to one or more partially formed diapers, to one or more individual, finished diapers, and one or more diapers in any state or states in between.

CAE can be used to design, simulate, and/or evaluate diaper materials, their structures and compositions, as well as their performance characteristics, such as swelling and deformation. CAE can also be used to design, simulate, and/or evaluate diaper features or products. As examples, CAE can be used to simulate the performance of various aspects of diaper products, such as fluid transport and storage, thermal and mechanical performance, fluid structure interactions, product packaging and dispensing, and gluing performance. CAE can also be used to simulate the fit of a diaper product on a wearer.

As additional examples, CAE can be used to design, simulate, and/or evaluate diaper machines and/or diaper manufacturing processes. CAE can be used to simulate mechanical aspects of diaper manufacturing processes related to cutting, material deformation, bonding, and material-product interactions. CFD can be used to simulate air flow in diaper machines as well as liquid flow and/or transport in diaper manufacturing processes. CAE can also be used to simulate and/or evaluate the feasibility of diaper manufacturing processes, the reliability of diaper machines, and potential quality issues with diaper materials.

FSI can be used to simulate and/or evaluate the transport of particles in air in diaper manufacturing processes. For example, FSI can be used to design, simulate, and/or evaluate diaper manufacturing processes in which one or more absorbent materials are conveyed through a diaper machine and added to a web of diaper materials.

FSI can also be used to simulate and/or evaluate the transport and/or deformation of sheet-like diaper materials as they interact with diaper machines and with air in diaper manufacturing processes. As an example, FSI can be used to simulate and/or evaluate a physical behavior of a web of diaper materials interacting with a diaper converting machine and moving through air, as described in connection with the embodiments of FIGS. 1A-4B, and 8. As another example, FSI can be used to simulate and/or evaluate a physical behavior of diaper trim materials interacting with a trim removal apparatus and moving through air, as described in connection with the embodiments of FIGS. 5A-8.

CAE software can be similarly applied to aspects of various feminine hygiene products, such as liners, feminine liners, hygiene liners, hygienic liners, panty liners, sanitary liners, pads, feminine pads, hygiene pads, hygienic pads, panty pads, sanitary pads, napkins, feminine napkins, hygiene napkins, hygienic napkins, panty napkins, sanitary napkins, feminine hygiene articles, feminine sanitary articles, etc.

CAE software can also be similarly applied to aspects of some other disposable articles, such as paper towels, bathroom tissues, facial tissues, wipes, and cleaning pads, etc.

FIG. 1A is an outside plan view illustrating an exemplary diaper 110 laid out flat. The diaper 110 includes a chassis 111, side edges 114, end edges 115, an absorbent core 112, and ears 113. The ears 113 include fasteners, so the diaper 110 is configured as a fastenable diaper. The diaper also has a lateral centerline 121, a longitudinal centerline 122, an overall length 123, an overall width 124, and fold lines 116. During the diaper manufacturing process, laterally outboard portions of the diaper 110 can be folded inward along the fold lines 116, as described in connection with the embodiment of FIG. 1B.

Figure 1B:
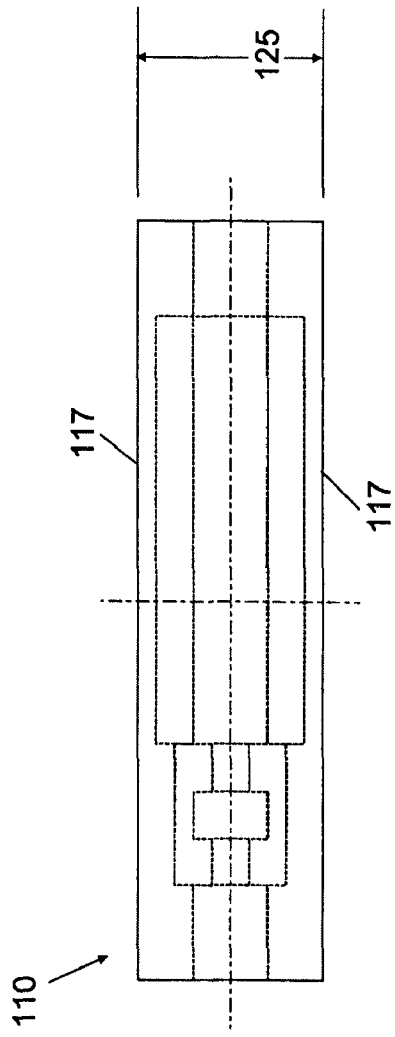
FIG. 1B is an outside plan view illustrating a folded version of the diaper of the embodiment of FIG. 1A.

FIG. 1B is an outside plan view illustrating a folded version of the exemplary diaper 110 of the embodiment of FIG. 1A. In FIG. 1B, laterally outboard portions of the diaper 110 are folded along the fold lines 116 onto an inside of the diaper 110. The folded diaper 110 has folded edges 117 and a folded width 125.

The exemplary diaper 110 is not intended to illustrate all details of a diaper. The exemplary diaper 110 is also not intended to limit embodiments of the present disclosure. Instead, the exemplary diaper 110 is intended to illustrate at least some of the diaper features on one kind of diaper, which can be incorporated into a computer based model of a portion of a continuous web of diaper materials, as described in the embodiment of FIG. 2A.

Figure 2A:
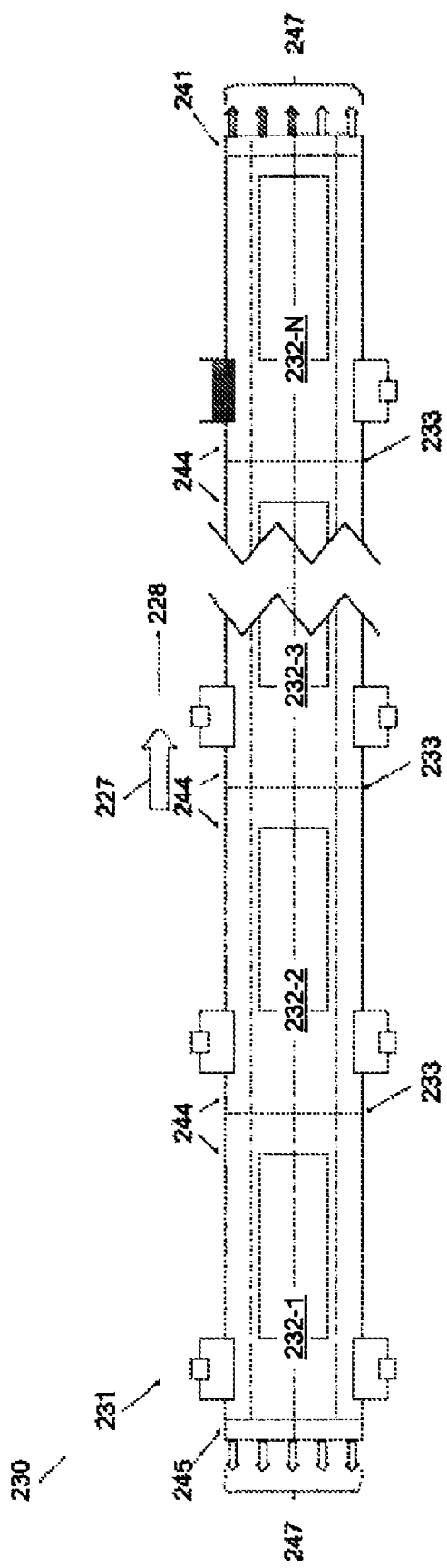
FIG. 2A is an outside plan view illustrating a computer based model of a portion of a continuous web of diaper materials, for use in a diaper manufacturing process.

FIG. 2A is an outside plan view illustrating a computer based model 230 of a portion of a continuous web of diaper materials 231, for use in a diaper manufacturing process. During the diaper manufacturing process, the portion of the continuous web of diaper materials 231 moves with a velocity 227 in a machine direction 228. The portion of the continuous web of diaper materials 231 includes a sheet-like series of partially formed diapers 232-1 through 232-N, where "N" is any positive integer. In the embodiment of FIG. 2A, the web of diaper materials 231 includes four partially formed diapers.

The partially formed diapers 232-1 through 232-N are connected together end-to-end. For clarity, separation lines 233 illustrate end edges to be formed downstream in the diaper manufacturing process. Each of the partially formed diapers 232-1 through 232-N can be a partially formed version of the diaper 110 of the embodiment of FIG. 1A. In the embodiment of FIG. 2A, each of the partially formed diapers 232-1 through 232-N includes a chassis, an absorbent core, and ears with fasteners.

The model 230 of the portion of the continuous web of diaper materials 231 includes a leading edge 241, a middle portion 244, and a trailing edge 245. The leading edge 241 corresponds with an end edge of the diaper 232-N. The trailing edge 245 corresponds with an end edge of the diaper 232-1. The model 230 also includes tensions resulting from tensioning forces 247 applied to the leading edge 241 and the trailing edge 245.

In various embodiments, a computer based model of diaper materials can include any number of partially formed diapers, including portions of diapers. For example, in a computer based model, a continuous web of diaper materials can include a leading edge and/or a trailing edge, which may not correspond with an end edge of a diaper. In some embodiments, a computer based model of diapers and/or diaper materials can include partially or completely formed diapers with any number of any features, such as waistbands, leg bands, leg cuffs, absorbent core assemblies, etc. A computer based model of a diaper and/or diaper materials can, in some embodiments, include any kind of diaper, such as a fastenable type diaper or a preformed pant-type diaper.

Figure 2B:
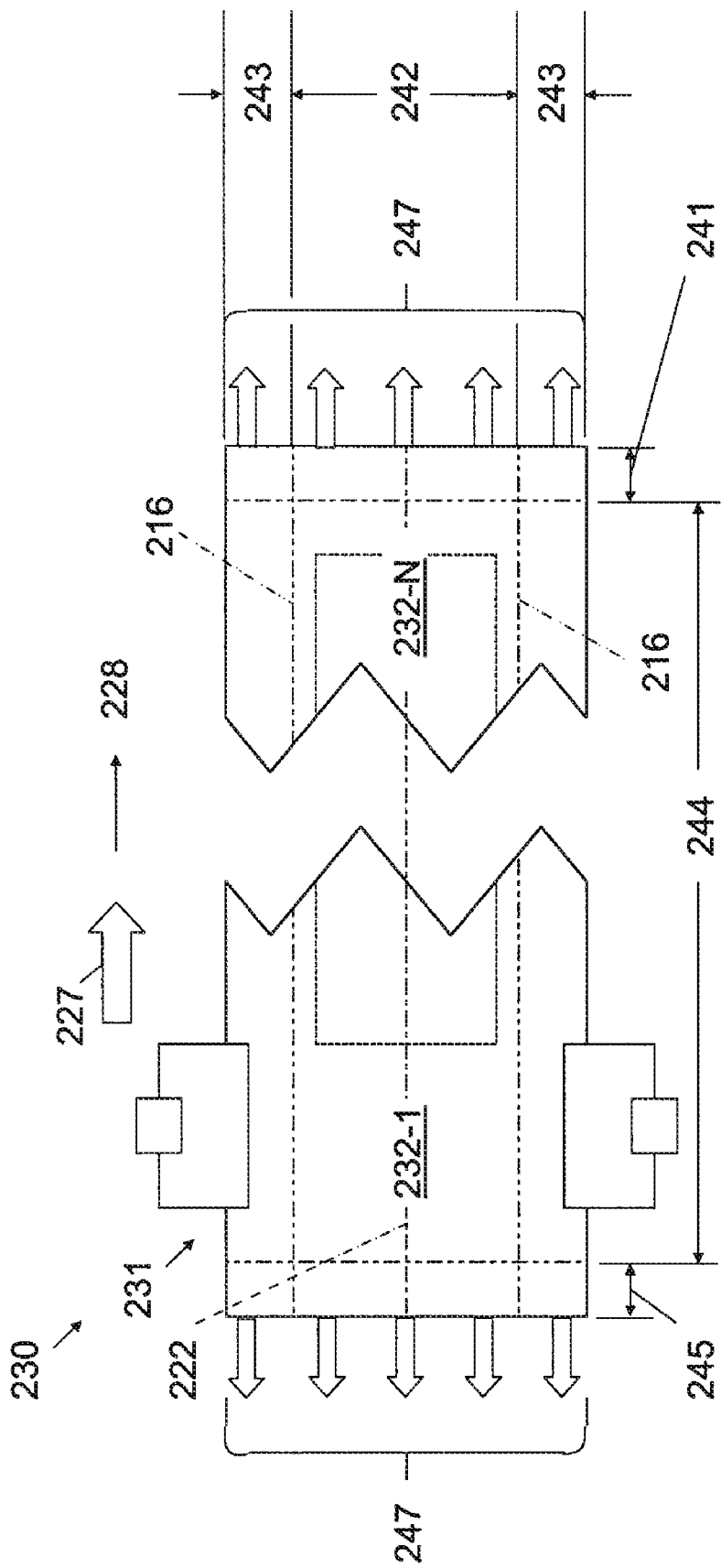
FIG. 2B is an outside plan view illustrating the computer based model of the portion of the continuous web of diaper materials of the embodiment of FIG. 2A.

FIG. 2B is a plan view illustrating the computer based model 230 of the portion of the continuous web of diaper materials 231, of the embodiment of FIG. 2A. The computer based model 230 is illustrated as broken, to illustrate further details. The portion of the continuous web of diaper materials 231 includes the sheet-like series of partially formed diapers 232-1 through 232-N. During the diaper manufacturing process, the portion of the continuous web of diaper materials 231 moves with a velocity 227 in a machine direction 228. The portion of the continuous web of diaper materials 231 also includes fold lines 216 and a longitudinal centerline 222, which correspond with the folds lines and the longitudinal centerlines of each of the partially formed diapers 232-1 through 232-N.

The model 230 of the portion of the continuous web of diaper materials 231 can be created by using FSI software. The model 230 can be created by putting in dimensions and material properties for the portion of the continuous web of diaper materials 231, generating a mesh, defining boundary conditions for the model 230, and defining interactions between parts of the diaper materials and other parts and/or models. By doing so, the computer based model 230 can be configured to accurately simulate the physical behavior of a real world continuous web of diaper materials.

The portion of the continuous web of diaper materials 231 can be configured with dimensions that are similar to or the same as dimensions of a real world continuous web of diaper materials. These dimensions can be determined by measuring real world samples of diaper materials, by using accepted values for known materials, and/or by estimation. Values for the length, width, thickness, and/or other dimensions of the chassis, core, ear, fastener and other parts of the partially formed diapers 232-1 through 232-N can be put into FSI software.

Some or all of the portion of the continuous web of diaper materials 231 can be configured with material properties that are similar to or the same as material properties of a real world continuous web of diaper materials. These material properties can be determined by measuring real world samples of diaper materials, by using accepted values for known materials, and/or by estimation. Values for the tensile strength, bending behavior, density and/or other mechanical properties of the chassis, core, ear, fastener and other parts of the partially formed diapers 232-1 through 232-N can be put into the FSI software. As an example, material property values for the middle portion 244 can be put into the FSI software so that the middle portion 244 can be configured as a flexible middle portion.

In various embodiments, a computer based CAE model can include one or more material properties that differ from material properties of the real world thing, in order for the overall model to account for inherent limitations of the model and/or to more accurately represent the overall physical behavior of the real world thing, as will be understood by one of ordinary skill in the art. In various embodiments of the model 230, some of the portion of the continuous web of diaper materials 231 can be configured with one or more material properties that differ from material properties of a real world continuous web of diaper materials, in order for the overall model 230 to account for inherent limitations of the model 230 and/or to more accurately represent the overall physical behavior of a real world continuous web of diaper materials. For example, the model 230 is limited in that it represents only a portion of a continuous web. The model 230 of the portion 231 has ends edges, while a real world web of diaper materials would be continuous as it enters a diaper machine. As a result, the model 230 has an inherent limitation in that the portion 231 is not connected to upstream and/or downstream portions of a web as a real world continuous web of diaper materials would be.

If, in the model 230, an end edge of the portion of the continuous web of diaper materials 231 is configured with material properties that are similar to material properties of a real world continuous web of diaper materials, so that the end edge is flexible, then, during the simulation of the model 230, the end edge may tend to distort, bend, and/or curl, so that the edge may not completely accurately represent the physical behavior of a real world continuous web of diaper materials.

In order to address this difficulty, in a model of a portion of a continuous web of diaper materials, a leading edge and/or a trailing edge can include one or more portions configured with material properties that differ from material properties of a real world continuous web of diaper materials. These differing material properties can effectively represent physical constraints that would be provided by upstream and/or downstream portions of a real world continuous web of diaper materials. Specifically, the one or more portions can be configured with differing material properties to be sufficiently rigid so as to resist distorting, bending and/or curling. Any part or parts or all of an end edge can be configured to include one or more rigid portions.

In the embodiment of FIG. 2B, the leading edge 241 includes a middle portion configured to be a rigid portion 242. The rigid middle portion 242 is substantially centered on the longitudinal centerline 222 and extends laterally outward from the longitudinal centerline 222 to about the fold lines 216. In various embodiments, the rigid middle portion 242 may not extend all the way out to the fold lines 216. Since the rigid middle portion 242 is laterally inboard to the fold lines 216, laterally outboard portions of the portion of the continuous web of diaper materials 231 can be folded along the fold lines 216 onto an inside of the diaper materials, as described in connection with the embodiments of FIGS. 1A-1B. The leading edge 241 also includes flexible outer portions 243, which are laterally outboard from the rigid middle portion 242. The flexible outer portions 243 can be configured with material properties that are similar to or the same as material properties of corresponding portions of a real world continuous web of diaper materials, which may or may not be same the as the material properties of other portions of the chassis.

Also, in the embodiment of FIG. 2B, the trailing edge 241 is configured to be a rigid trailing edge 242.

The model 230 of the portion of the continuous web of diaper materials 231 can also include a mesh. A mesh is a collection of small, connected polygon shapes that define elements in a CAE computer based model. A mesh can be generated by using commercially available meshing software. In some embodiments, the type of mesh and/or the size of mesh elements can be controlled with user inputs into the meshing software, as will be understood by one of ordinary skill in the art. The mesh for the portion of the continuous web of diaper materials 231 can be generated using commercially available meshing software. For clarity, a mesh is not illustrated in the embodiment of FIGS. 2A and 2B.

The model 230 of the portion of the continuous web of diaper materials 231 can also include boundary conditions. Boundary conditions are defined physical factors which can interact with parts of a CAE computer based model. Examples of boundary conditions include forces, pressures, velocities, and physical constraints, each of which can be assigned a particular magnitude and direction and/or can be applied to a specific location within the model. Boundary conditions can act on the model in various ways, to move, constrain, and/or deform one or more parts in the model. Boundary conditions can be determined by observing, measuring, analyzing and/or estimating real world physical factors which can interact with a real world continuous web of diaper materials. In various embodiments, a computer based CAE model can include one or more boundary conditions that differ from real world physical constraints, in order for the overall model to account for inherent limitations of the model and/or to more accurately represent the overall physical behavior of the real world thing, as will be understood by one of ordinary skill in the art. Boundary conditions for the portion of the continuous web of diaper materials 231 can be put into the FSI software.

The model 230 includes boundary conditions of forces and velocities. The portion of the continuous web of diaper materials 231 includes the velocity 227 in the machine direction 228, which is applied to the entire web, to simulate the real world movement of a continuous web of diaper materials in a diaper machine. In addition, the leading edge 241 and/or the trailing edge 245 can be directed along a particular pathway, to simulate physical constraints within a diaper machine.

The portion of the continuous web of diaper materials 231 also includes tensions resulting from the tensioning forces 247, which can be distributed along end edges of the web, to simulate the real world tensions in a continuous web of diaper materials in a diaper machine. The tensioning forces 247 distributed along the leading edge 241 can be about equal or exactly equal in magnitude to the tensioning forces 247 distributed along the trailing edge 245. The tensioning forces 247 distributed along the leading edge 241 can be directed generally in the machine direction 228, while the tension forces 247 distributed along the trailing edge 245 can be directed generally opposite to the machine direction 228. In various embodiments, some or all of the forces and/or velocities included in the model 230 can be determined in one or more prior simulations and subsequently applied to the model 230.

The model 230 of the portion of the continuous web of diaper materials 231 can also include defined interactions between its parts and/or with part or all of one or more other CAE computer based models. The model 230 of the portion of the continuous web of diaper materials 231 is defined so that all of its parts can physically interact with each other. The model 230 of the portion of the continuous web of diaper materials 231 is also defined so that it can physically interact with all parts of a computer based model 350 of a portion of a diaper converting machine 351, as described in connection with the embodiment of FIG. 3. The model 230 of the portion of the continuous web of diaper materials 231 is further defined so that it can also physically interact with all parts of a computer based model 470 of air 471, 473, as described in connection with the embodiment of FIGS. 4A and 4B. In various embodiments, one or more computer based CAE models can include one or more defined interactions that differ from real world physical interactions, in order to account for inherent limitations in the models and/or to more accurately represent the overall physical behaviors of the real world things, as will be understood by one of ordinary skill in the art. These interactions can be defined in the FSI software.

Figure 3:
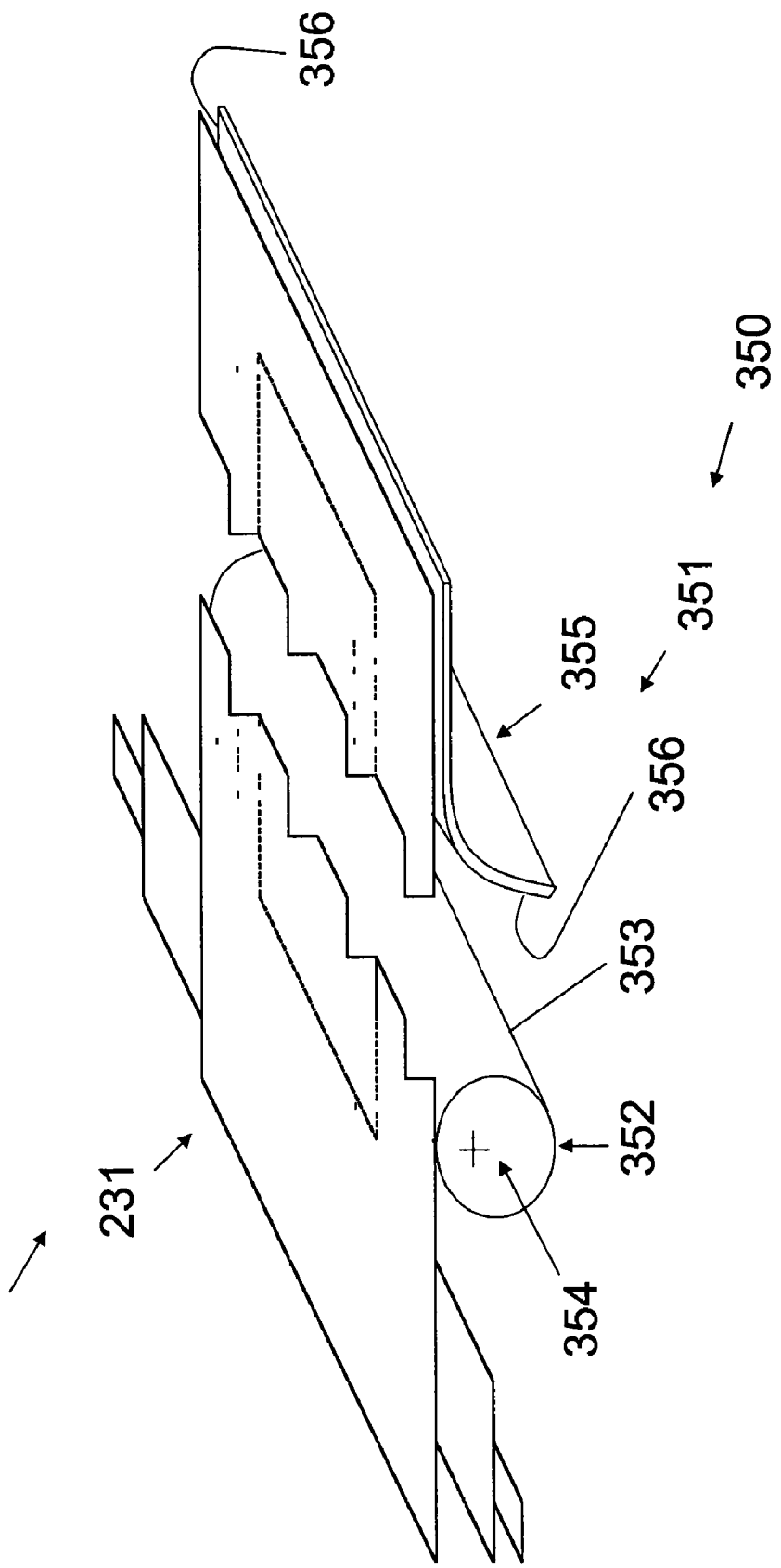
FIG. 3 is a perspective view illustrating the computer based model of the portion of the continuous web of diaper materials of the embodiment of FIG. 2B, and a computer based model of a portion of a diaper converting machine, for use in the diaper manufacturing process.

FIG. 3 is a perspective view illustrating the computer based model 230 of the portion of the continuous web of diaper materials 231 of the embodiment of FIG. 2A, and a computer based model 350 of a portion of a diaper converting machine 351, for use in the diaper manufacturing process. The diaper converting machine is configured to convert a continuous web of diaper materials into individual diapers. The portion of the diaper converting machine 351 includes a roller 352 with a roller contact surface 353 and a roller axis 354. The portion of the diaper converting machine 351 also includes a folding apparatus 355 with a folding contact surface 356.

The roller contact surface 353 and the folding contacting surface 356 are surfaces configured for contact with the computer based model 230 of the portion of the continuous web of diaper materials 231. The roller 352 is configured so that the portion of the continuous web of diaper materials 231 can be conveyed over the roller 352. The folding apparatus 355 is configured so that the portion of the continuous web of diaper materials 231 can be folded by the folding apparatus 355.

In various embodiments, a computer based model of a diaper converting machine can include any number of any kind of machine part or apparatus known in the art. For example, the diaper converting machine can include one or more rollers, folding apparatuses, bonding apparatuses, cutting apparatuses, etc.

The model 350 of the portion of the diaper converting machine 351 can be created by using FSI software. The model 350 can be created by putting in dimensions and material properties for the portion of the diaper converting machine 351, generating a mesh, defining boundary conditions for the model 350, and defining interactions between parts of the portion of the diaper converting machine 351 and other parts or models. By doing so, the computer based model 350 can be configured to accurately simulate the physical behavior of a real world diaper converting machine.

The portion of the diaper converting machine 351 can have dimensions that are similar to or the same as dimensions of a real world diaper converting machine. These dimensions can be determined by measuring real world parts of a diaper converting machine, by using documented dimensions for known parts, and/or by estimation. Values for the length, width, thickness, and/or other dimensions of the roller 352 and the folding apparatus 355 can be put into FSI software.

The portion of the diaper converting machine 351 can have material properties that are similar to or the same as material properties of a real world diaper converting machine. These material properties can be determined by measuring real world parts of a diaper converting machine, by using accepted values for known materials, and/or by estimation. Values for the mass, strength, coefficient of friction, and/or other mechanical properties of the roller 352 and the folding apparatus 355 can be put into the FSI software. As examples, material property values can be put into the FSI software so that the roller contact surface 353 has a coefficient of friction of about 1.0, and the folding contacting surface 356 has a coefficient of friction of about 0.1. In various embodiments, material property values for other coefficients of friction can also be used.

The model 350 of the portion of the diaper converting machine 351 can also include a mesh of machine elements which can be generated by using commercially available meshing software. In some embodiments, the size of these machine elements can be defined with user inputs into the mesh software. As an example, the size of machine elements for the portion of the diaper converting machine 351 can be defined such that substantially all of the machine element lengths are greater than or equal to about 1 millimeter and less than or equal to about 10 millimeters. Also as an example, the machine elements can be defined such that substantially all of the machine element lengths are about 5 millimeters. In various embodiments, user inputs for other machine element lengths can also be used. For clarity, the mesh is not illustrated in the embodiment of FIG. 3.

The model 350 of the portion of the diaper converting machine 351 can also include boundary conditions. The model 350 includes boundary conditions of physical constraints. The roller 352 is physically constrained by boundary conditions to rotate about the roller axis 354. The roller axis 354 is physically constrained by boundary conditions to maintain a fixed location and orientation in space, despite forces acting upon it. The folding apparatus 355 is also physically constrained by boundary conditions to maintain a fixed location and orientation in space, despite forces acting upon it. Boundary conditions for the roller 352 and the folding apparatus 355 can be put into the FSI software.

The model 350 of the portion of the diaper converting machine 351 can also include defined interactions between its parts and/or with part or all of one or more other CAE computer based models. The model 350 of the portion of the diaper converting machine 351 is defined so that all of its parts can physically interact with each other. The model 350 of the portion of the diaper converting machine 351 is also defined so that it can physically interact with all parts of the computer based model 230 of the portion of the continuous web of diaper materials 231, as described in connection with the embodiment of FIGS. 2A-2B. The model 350 of the portion of the diaper converting machine 351 is also defined so that it can physically interact with all parts of a computer based model 470 of air 471, 473, as described in connection with the embodiment of FIGS. 4A and 4B. These interactions can be defined in the FSI software.

Figure 4A:
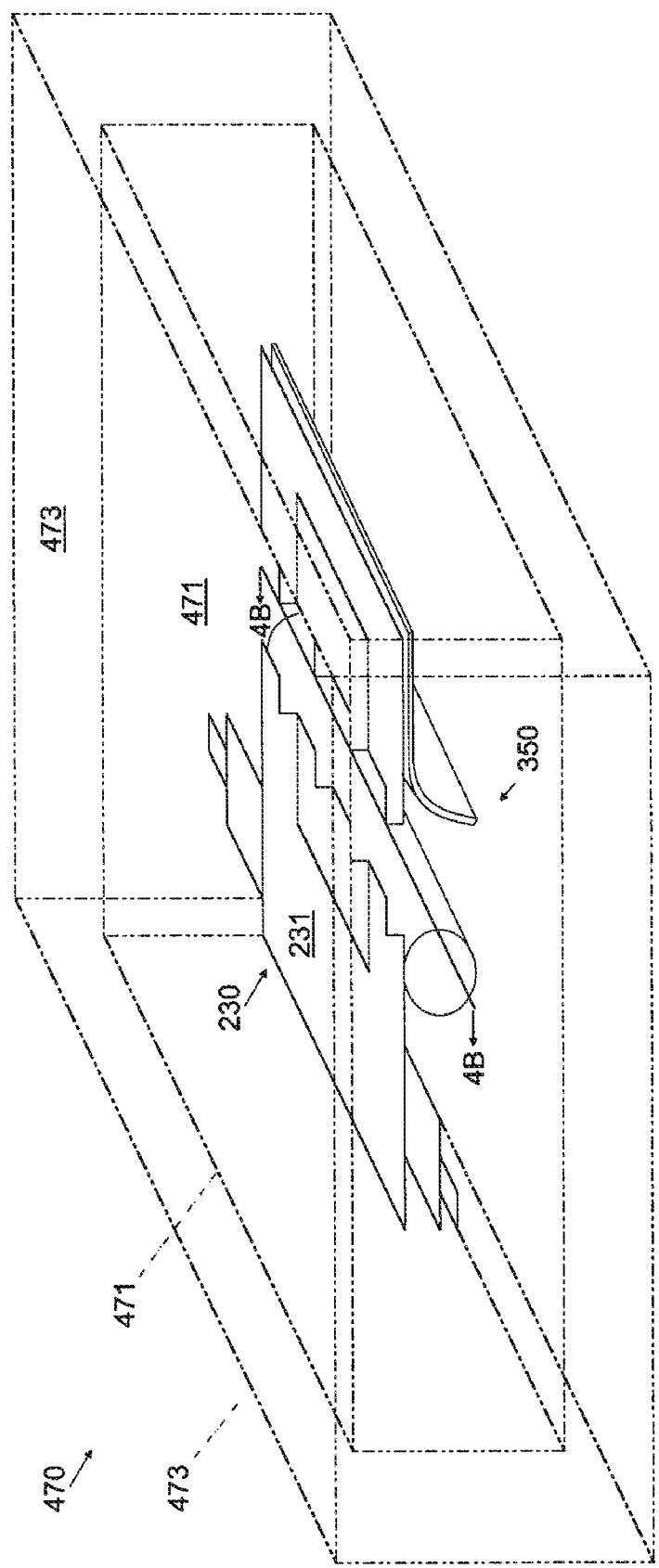
FIG. 4A is a perspective view illustrating the computer based model of the portion of the continuous web of diaper materials of the embodiment of FIG. 2B, the computer based model of the portion of the diaper converting machine of the embodiment of FIG. 3, and a computer based model of air present in the diaper manufacturing process.

FIG. 4A is a perspective view illustrating the computer based model 230 of the portion of the continuous web of diaper materials 231 of the embodiment of FIG. 2A, the computer based model 350 of the portion of the diaper converting machine 351 of the embodiment of FIG. 3, and a computer based model 470 of air 471, 473 present in the diaper manufacturing process. The model 470 includes a first volume of air 471 and a second volume of air 473. For clarity, air is illustrated as transparent, throughout the present disclosure.

The first volume of air 471 completely surrounds the portion of the continuous web of diaper materials 231 and completely surrounds the portion of the diaper converting machine 351. In various embodiments, the first volume of air 471 may surround a portion or substantially all of the portion of the continuous web of diaper materials 231 and/or a portion or substantially all of the portion of the diaper converting machine 351. The second volume of air 473 completely surrounds the first volume of air 471. In various embodiments, the second volume of air 473 may surround a portion or substantially all of the first volume of air 471. In some embodiments, the first volume of air 471 and/or the second volume of air 473 can include a number of smaller volumes of air.

Figure 4B:
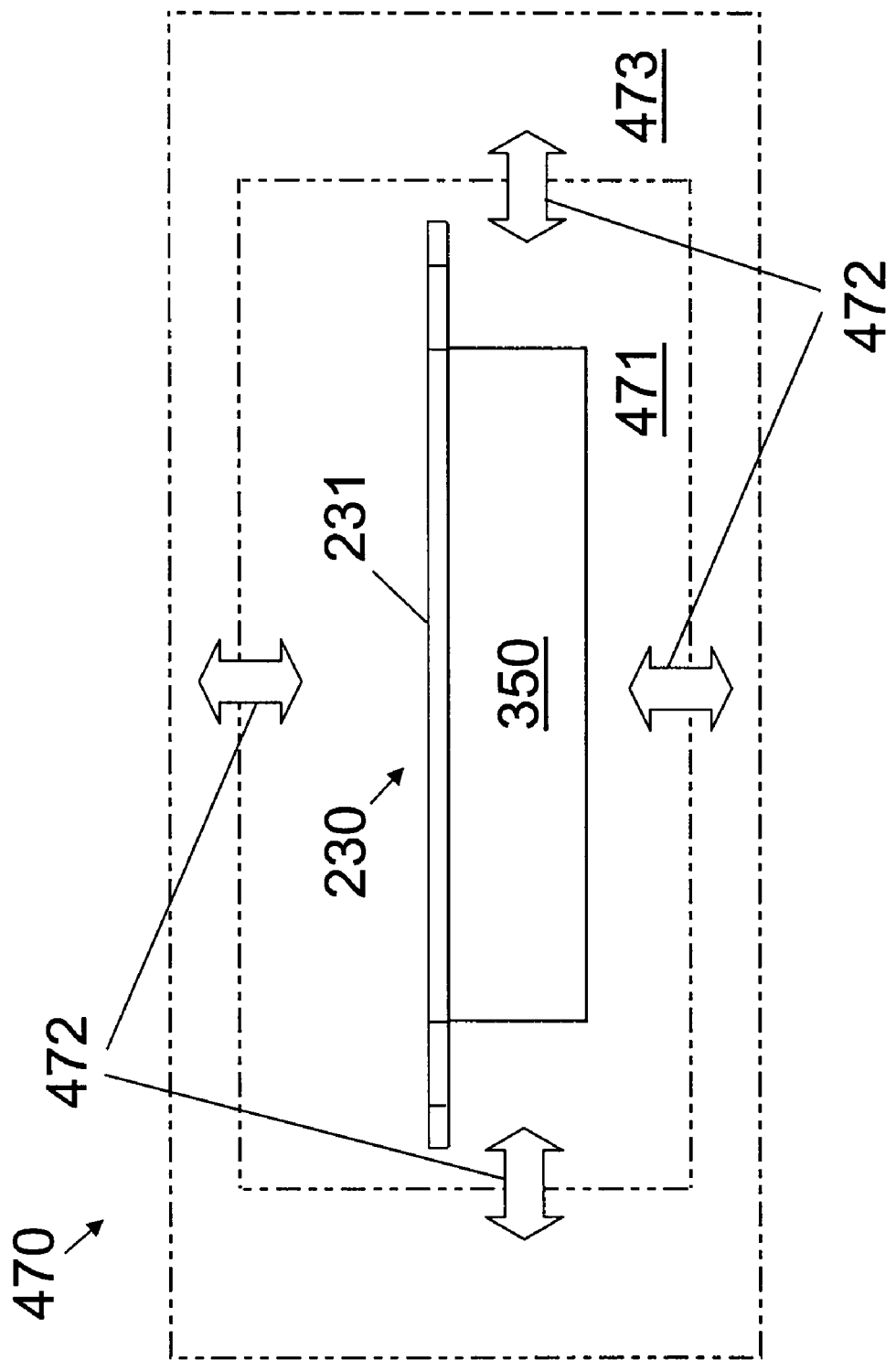
FIG. 4B is a cross-sectional view illustrating the computer based model of the portion of the continuous web of diaper materials of the embodiment of FIG. 2B, the computer based model of the portion of the diaper converting machine of the embodiment of FIG. 3, and the computer based model of the air of the embodiment of FIG. 4A.

FIG. 4B is a cross-sectional view along section line 4B-4B in FIG. 4A, illustrating the computer based model 230 of the portion of the continuous web of diaper materials 231 of the embodiment of FIG. 2A, the computer based model 350 of the portion of the diaper converting machine 351 of the embodiment of FIG. 3, and the computer based model 470 of the air 471, 473 of the embodiment of FIG. 4A.

The first volume of air 471 can have various dimensions, which can determine how much of the portion of the continuous web of diaper materials 231 and how much of the portion of the diaper converting machine 351 are surrounded by the first volume of air. The second volume of air 471 can also have various dimensions, which can determine how much of the first volume of air 471 is surrounded by the second volume of air 473. While the first and second volumes of air 471, 473 are illustrated as rectilinear shapes in the embodiment of FIGS. 4A and 4B, the volumes can also take different shapes. Dimensions for the first volume of air 471 and for the second volume of air 473 can be put into FSI software.

The first volume of air 471 and the second volume of air 473 can each have material properties that are similar to or the same as material properties of real world air in and/or around a diaper converting machine. These material properties can be determined by measuring real world air in and/or around a diaper converting machine, by using accepted values for air, and/or by estimation. Values for pressure, temperature, and/or other gaseous properties for the first volume of air 471 and for the second volume of air 473 can be put into the FSI software.

In various embodiments, the second volume of air 473 can be configured at a particular constant pressure that is about equal to an atmospheric pressure (e.g. about 100 kPa), to simulate the surrounding atmosphere. The first volume of air 471 can, in some embodiments, be configured to allow pressure variations, to simulate local changes in pressure proximate to the portion of the continuous web of diaper materials 231 and/or to the portion of the diaper converting machine 351.

The first volume of air 471 and the second volume of air 473 can also each include a mesh of air elements which can be generated by using commercially available meshing software. In some embodiments, the size of these air elements can be defined with user inputs into the mesh software. As an example, the size of air elements for the first volume of air 471 and/or the second volume of air 473 can be defined such that substantially all of the air element lengths are less than or equal to about two times the machine element lengths of substantially all of the machine elements of the model 350 of the portion of the diaper converting machine 351. In various embodiments, user inputs for other air element lengths can also be used. For clarity, the mesh is not illustrated in the embodiment of FIGS. 4A and 4B.

The first volume of air 471 and the second volume of air 473 can each also include boundary conditions. The first volume of air 471 and the second volume of air 473 each include boundary conditions of physical constraints. The first volume of air 471 and the second volume of air 473 are each physically constrained by boundary conditions to maintain a fixed location and orientation in space, despite forces acting upon it. Boundary conditions for the first volume of air 471 and the second volume of air 473 can be put into the FSI software.

The first volume of air 471 and the second volume of air 473 can each also include defined interactions with each other and/or with part or all of one or more other CAE computer based models. The first volume of air 471 is defined to allow air exchanges 472 with the second volume of air 473, and vice versa, to simulate the real world movement of air. The first volume of air 471 and the second volume of air 473 are each defined so that they can each physically interact with all parts of the computer based model 230 of the continuous web of diaper materials 231, as described in connection with the embodiment of FIGS. 2A-2B. The first volume of air 471 and the second volume of air 473 are also each defined so that they can each physically interact with all parts of the computer based model 350 of the diaper converting machine 351, as described in connection with the embodiment of FIGS. 4A and 4B. These interactions can be defined in the FSI software.

FSI software can be used to simulate a physical behavior of the model 230 of the portion of the continuous web of diaper materials 231 interacting with the model 350 of the portion of the diaper converting machine 351 and moving through the model 470 of the air 471, 473. As a result, particular designs of a diaper converting machine and particular configurations of diapers and/or diaper materials can be evaluated and modified as computer based models before they are tested as real world things. FSI software can be similarly applied to simulate a physical behavior of models of part or all of one or more other disposable articles interacting with models of part or all of one or more machines for manufacturing such articles, and moving through a model of air.

FIG. 5A is a plan view illustrating a computer based model 538 of an exemplary discrete piece of diaper trim material 518. FIG. 5B is a plan view illustrating a computer based model 539 of an exemplary portion of a continuous piece of diaper trim material 519. The discrete piece of diaper trim material 518 and the portion of the continuous piece of diaper trim material 519 can be any kind of one or more materials, such as a film and/or a nonwoven. Each of the models 538 and 539 can be created by using FSI software. Each of the models 538 and 539 can be created, as described above, by putting in dimensions and material properties for the diaper trim material 518 or 519, generating a mesh, defining boundary conditions for the model 538 or 539, and defining interactions between parts of the diaper trim material 519 or 519 and other parts or models. By doing so, each of the computer based models 538 and 539 can be configured to accurately simulate the physical behavior of a real world diaper trim material.

Figure 6:
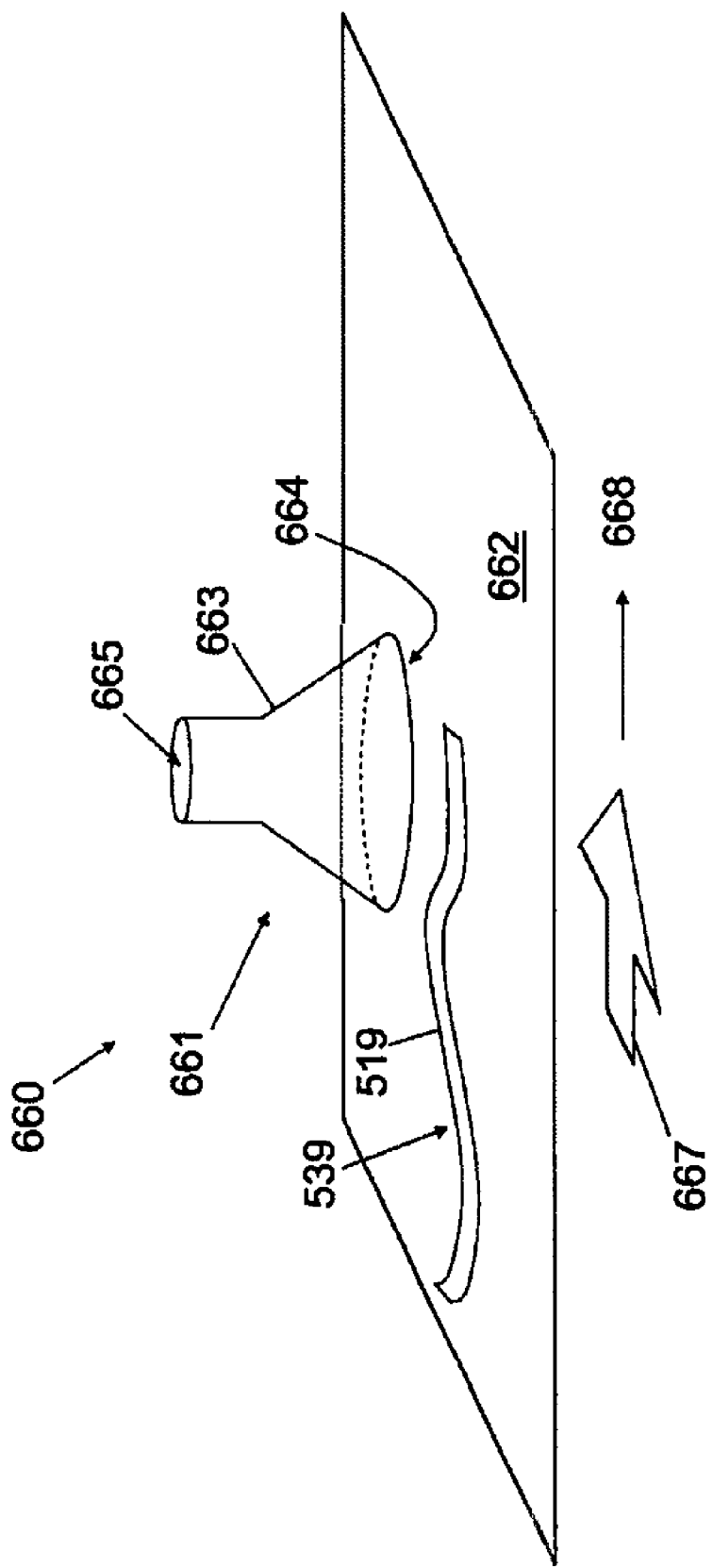
FIG. 6 is a perspective view illustrating the computer based model of the portion of the continuous piece of diaper trim material of the embodiment of FIG. 5B, and a computer based model of a portion of a trim removal apparatus, for use in diaper manufacturing process.

FIG. 6 is a perspective view illustrating the computer based model 539 of the portion of the continuous piece of diaper trim material 519 of the embodiment of FIG. 5B, and a computer based model 660 of a portion of a trim removal apparatus 661, for use in a diaper manufacturing process. The model 660 includes a portion of a conveyor 662 and a portion of a trim removal apparatus 661. The portion of the trim removal apparatus 661 includes a nozzle 663 with a nozzle entrance 664 and a nozzle exit 665. The nozzle entrance 664 is configured with a particular size and shape and is oriented above the portion of the conveyor 662. The portion of the continuous piece of diaper trim material 519 rests on the portion of the conveyor 662. During the diaper manufacturing process, the portion of the conveyor 662 moves with a velocity 667 in a conveyor direction 668 so that the portion of the continuous piece of diaper trim material 519 passes below the nozzle entrance 664. The trim removal apparatus 661 is configured to physically transport the portion of the continuous piece of diaper trim material 519 through the nozzle entrance 664 using a vacuum. In various embodiments, a trim removal apparatus can be similarly configured to physically transport a discrete piece of diaper trim material.

The model 660 can be created, as described above, by putting in dimensions and material properties for the trim removal apparatus 661, generating a mesh, defining boundary conditions for the model 660, and defining interactions between parts of the trim removal apparatus 661 and other parts or models. By doing so, the computer based model 660 can be configured to accurately simulate the physical behavior of a real world trim removal apparatus.

Figure 7A:
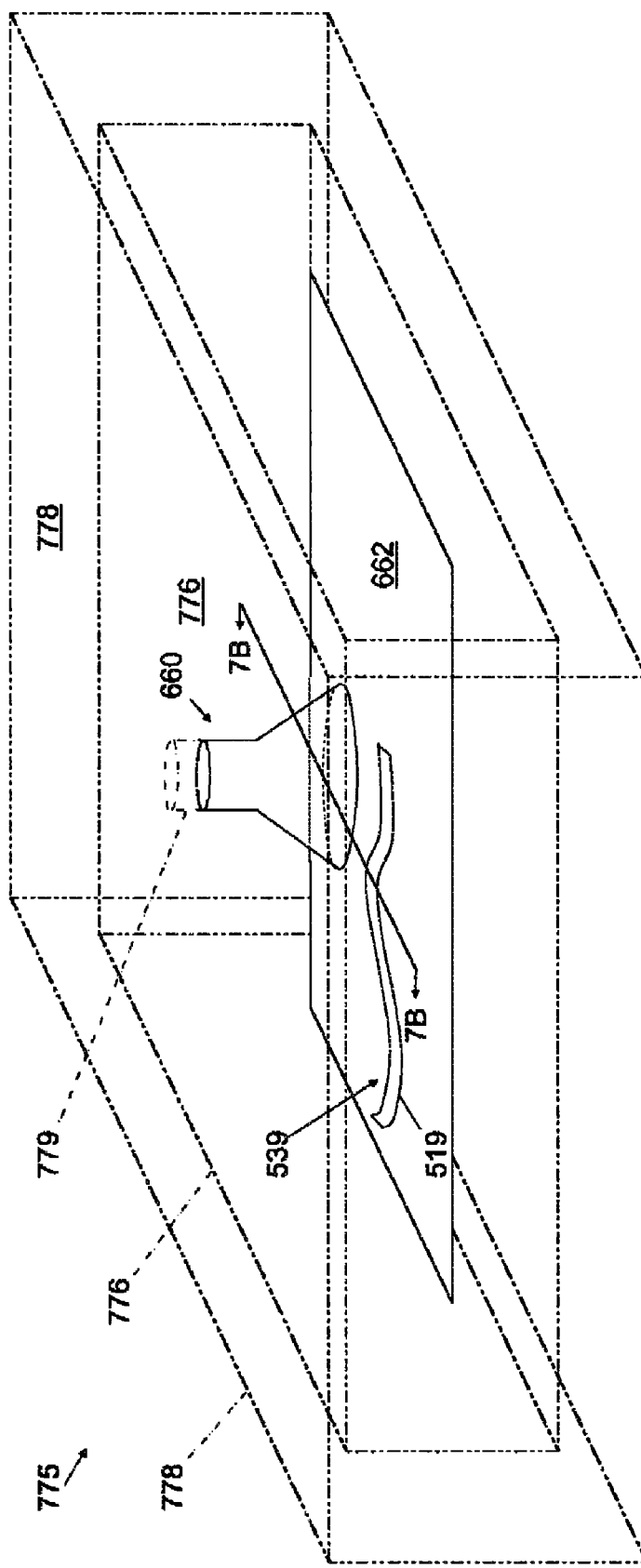
FIG. 7A is a perspective view illustrating the computer based model of the portion of the continuous piece of diaper trim material of the embodiment of FIG. 5B, the computer based model of the portion of the trim removal apparatus of the embodiment of FIG. 6, and a computer based model of air present in the diaper manufacturing process.

FIG. 7A is a perspective view illustrating the computer based model 539 of the portion of the continuous piece of diaper trim material 519 of the embodiment of FIG. 5B, the computer based model 660 of the portion of the trim removal apparatus 661 of the embodiment of FIG. 6, and a computer based model 775 of air present in the diaper manufacturing process. The model 775 includes a first volume of air 776, a second volume of air 778, and a third volume of air 779. FIG. 7A also illustrates the portion of the conveyor 662.

The first volume of air 776 completely surrounds the portion of the continuous piece of diaper trim material 519 and completely surrounds the portion of the trim removal apparatus 661. In various embodiments, the first volume of air 776 may surround a portion or substantially all of the portion of the continuous piece of diaper trim material 519 and/or a portion or substantially all of the portion of the trim removal apparatus 661. The second volume of air 778 completely surrounds the first volume of air 776. In various embodiments, the second volume of air 778 may surround a portion or substantially all of the first volume of air 776. The third volume of air 779 completely covers the nozzle exit 665. In various embodiments, the third volume of air 779 may cover and/or surround a portion or substantially all of the nozzle exit 665. In some embodiments, the first volume of air 776 and/or the second volume of air 778 and/or the third volume of air 779 can include a number of smaller volumes of air.

Figure 7B:
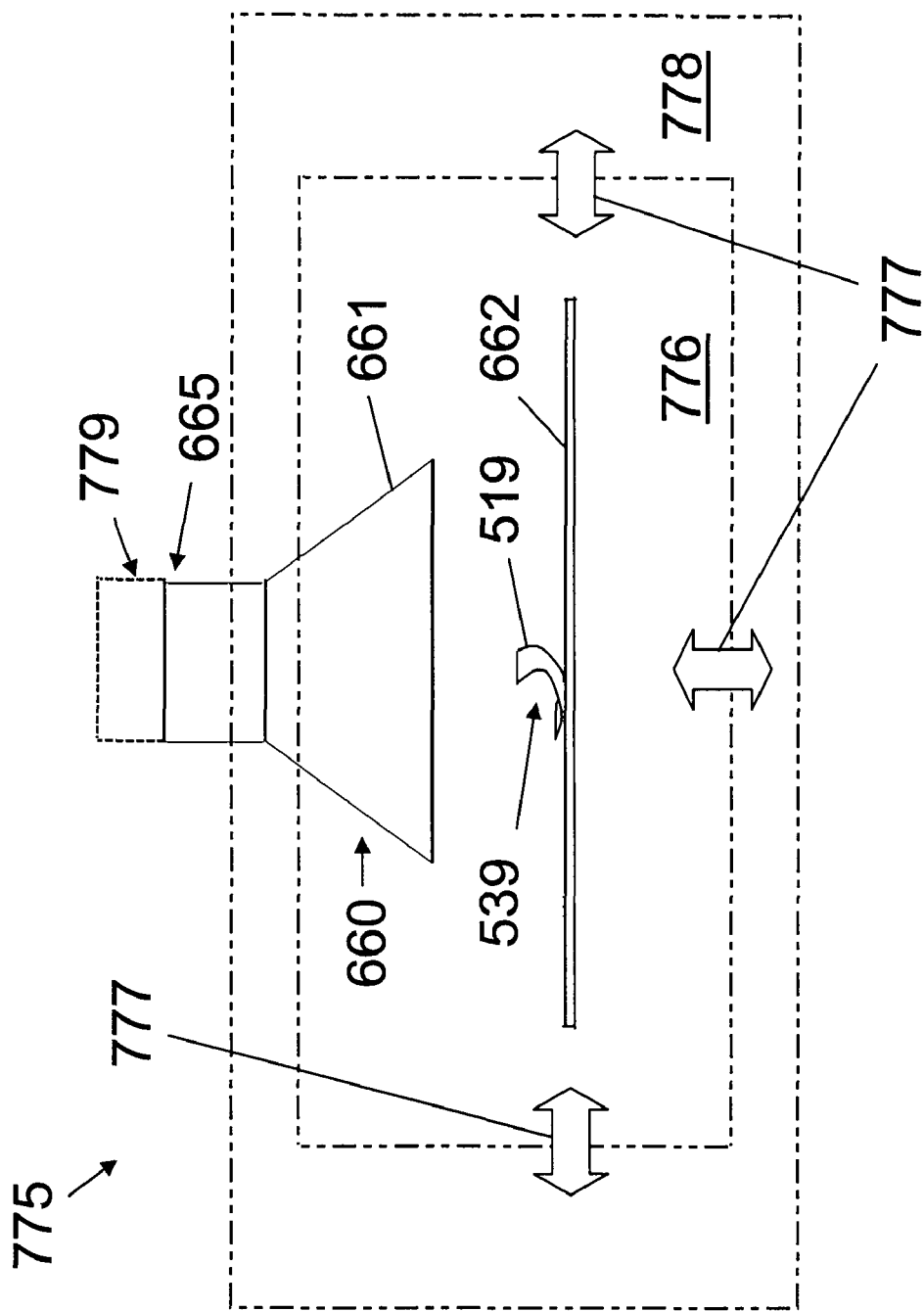
FIG. 7B is a cross-sectional view illustrating the computer based model of the portion of the continuous piece of diaper trim material of the embodiment of FIG. 5B, the computer based model of the portion of the trim removal apparatus of the embodiment of FIG. 6, and the computer based model of the air of the embodiment of FIG. 7A.

FIG. 7B is a cross-sectional view along section line 7B-7B in FIG. 7A, illustrating the computer based model 539 of the portion of the continuous piece of diaper trim material 519 of the embodiment of FIG. 5B, the computer based model 660 of the portion of the trim removal apparatus 661 of the embodiment of FIG. 6, and the computer based model 775 of the air 776, 778, 779 of the embodiment of FIG. 7A.

Each of the volumes of air 776, 778, 779 can have various dimensions and shapes, which can determine the degree to which the volume can surround and/or cover other particular models or parts of models. Dimensions for the first volume of air 776, the second volume of air 778, and the third volume of air 7779 can be put into FSI software. Values for pressure, temperature, and/or other gaseous properties for the volumes of air 776, 778, 779 can also be put into the FSI software.

In various embodiments, the second volume of air 778 can be configured at a particular constant pressure that is about equal to an atmospheric pressure (e.g. about 100 kPa), to simulate the surrounding atmosphere. The first volume of air 776 can, in some embodiments, be configured to allow pressure variations, to simulate local changes in pressure proximate to the portion of the continuous piece of diaper trim material 519 and/or to the portion of the trim removal apparatus 661. The third volume of air 779 can be configured at a second pressure that is less than the atmospheric pressure, in order to simulate a partial vacuum. The second pressure can, in various embodiments, be constant or variable.

Each of the volumes of air 776, 778, 779 can also include a mesh of air elements which can be generated, as described above, by using commercially available meshing software. Each of the volumes of air 776, 778, 779 can also include boundary conditions, physically constraining the volume to maintain a fixed location and orientation in space, despite forces acting upon it. These boundary conditions can be put into the FSI software.

Each of the volumes of air 776, 778, 779 can also include defined interactions with each other and/or with part or all of one or more other CAE computer based models. The first volume of air 776 is defined to allow air exchanges 777 with the second volume of air 778, and vice versa, to simulate the real world movement of air. The first volume of air 776 and the second volume of air 778 are each defined so that they can each physically interact with all parts of the computer based model 539 of the portion of the continuous piece of diaper trim material 519, as described in connection with the embodiment of FIGS. 7A-7B. These interactions can be defined in the FSI software.

FSI software can be used to simulate a physical behavior of the model 539 of the portion of the continuous piece of diaper trim material 519 interacting with the model 660 of the portion of the diaper trim removal apparatus 661 and moving through the model 775 of the air 776, 778, 779. As a result, particular designs of a diaper trim removal apparatus and particular configurations of diaper trim material can be evaluated and modified as computer based models before they are tested as real world things. FSI software can be similarly applied to simulate a physical behavior of models of discrete or continuous trim pieces of other disposable articles interacting with models of part or all of trim removal apparatuses, and moving through a model of air.

Figure 8:
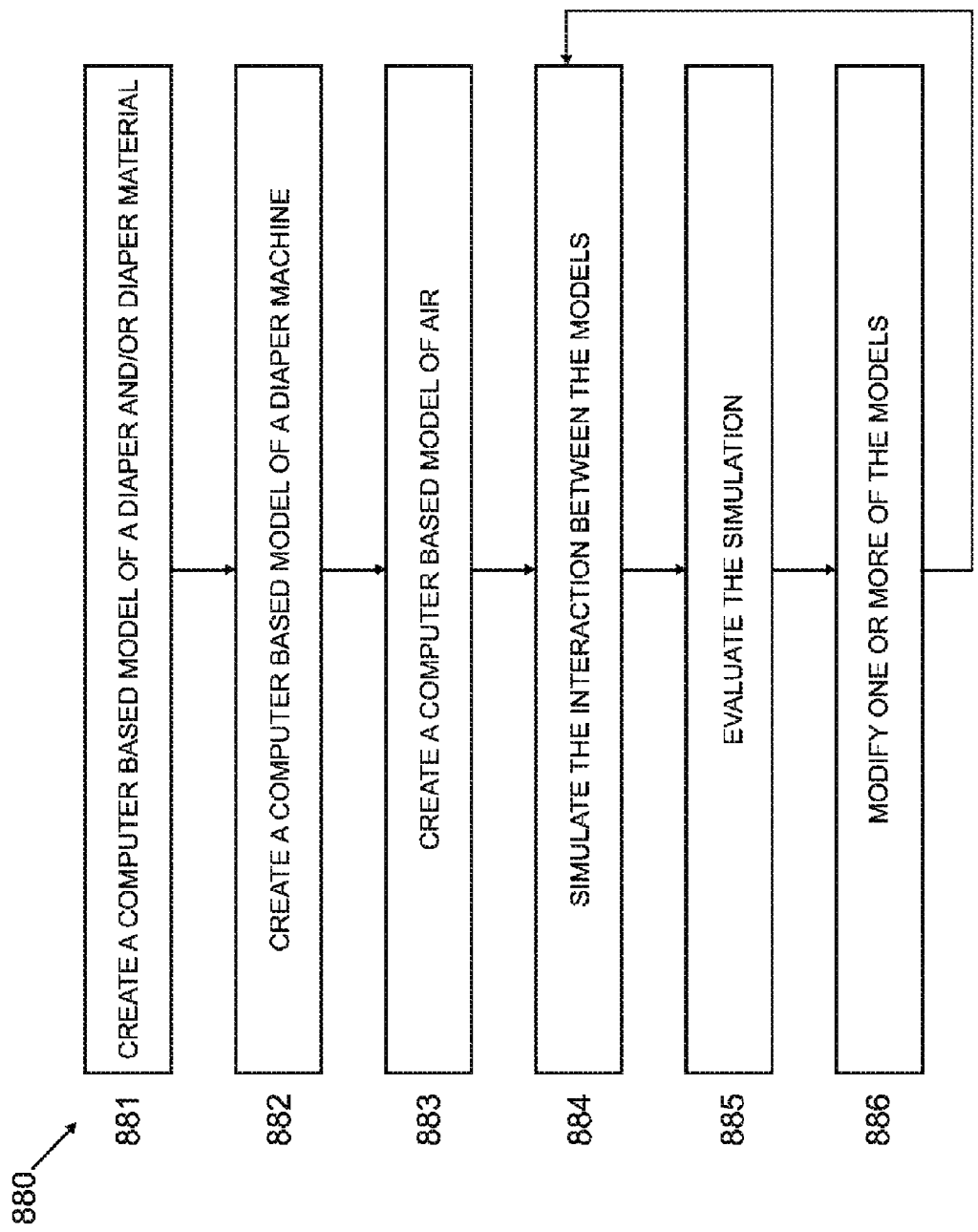
FIG. 8 is a chart illustrating a method of using computer based models of diapers and/or diaper materials, a diaper machine, and air, to simulate a physical behavior of diapers and/or diaper materials as they interact with a diaper machine and with air, in a diaper manufacturing process.

FIG. 8 is a chart illustrating a method 880 of using computer based models of diapers and/or diaper materials, a diaper machine, and air, to simulate a physical behavior of diapers and/or diaper materials as they interact with a diaper machine and with air, in a diaper manufacturing process. The method 880 includes a first step 881 of creating a computer based model of a diaper and/or diaper materials. As an example, the computer based model in the first step 881 can be the computer based model 230 of the portion of the continuous web of diaper materials 231, of the embodiments of FIGS. 2A-4B, for use in a diaper manufacturing process. As another example, the computer based model in the first step 881 can be the computer based model 538 of the discrete piece of diaper trim material 518, of the embodiment of FIG. 5A, or the computer based model 539 of the portion of the continuous piece of diaper trim material 519, of the embodiments of FIGS. 5B-7B, for use in a diaper manufacturing process. In various embodiments, the computer based model of the first step 881 can be a computer based model of any number and/or amount of any kind of diaper and/or diaper materials, in any state of formation, with any number of any kind of diaper features, as described herein.

The method 880 includes a second step 882 of creating a computer based model of a diaper machine. As an example, the computer based model of a diaper machine in the second step 882 can be the computer based model 350 of the portion of the diaper converting machine 351, of the embodiments of FIGS. 3-4B, for use in a diaper manufacturing process. As another example, the computer based model of a diaper machine in the second step 882 can be the computer based model 660 of the portion of the trim removal apparatus 661, of the embodiments of FIGS. 6-7B, for use in a diaper manufacturing process. In various embodiments, the computer based model of the second step 882 can be a computer based model of any portion of any kind of machine for any kind of function in a diaper manufacturing process, as described herein.

The method 880 includes a third step 883 of creating a computer based model of air. As an example, the computer based model of air in the third step 883 can be the computer based model 470 of the air 471, 473 of the embodiment of FIGS. 4A-4B. As another example, the computer based model of air in the third step 883 can be the computer based model 775 of the air 776, 778, 779 of the embodiment of FIGS. 7A-7B. In various embodiments, the computer based model of the third step 775 can be a computer based model of one or more volumes of air, as described herein.

In some embodiments of a method of simulating a physical behavior of a diaper and/or diaper materials in a diaper manufacturing process, the third step 883 may be omitted. For example, in circumstances where the effects of air on a diaper or diaper materials are known to be negligible, it may not be necessary to create and use a computer based model of air in the simulation. As another example, in preliminary simulations focused on basic interactions between the diaper and/or diaper materials and the diaper machine, it also may not be necessary to create and use a computer based model of air in the simulation.

Although the first step 881, the second step 882, and the third step 883 are described in numerical order in the present disclosure, any of these steps can be performed in any order, and/or at overlapping times, and/or at the same time, as will be understood by one of ordinary skill in the art.

The method 880 includes a fourth step 884 of simulating the interaction between the models. The fourth step 884 includes simulating the interaction between: the computer based model of the diaper and/or diaper materials from the first step 881; the computer based model of the diaper machine from the second step 882; and the computer based model of the air from the third step 883. Prior to or during the fourth step 884, the models to be interacted can be brought together.

In an embodiment of the present disclosure, the simulation of the fourth step 884 can simulate a physical behavior of the model 230 of the portion of the continuous web of diaper materials 231 interacting with the model 350 of the portion of the diaper converting machine 351 and moving through the model 470 of the air 471, 473, during a particular period of time. The simulation of the fourth step 884 can, in various embodiments, include simulating the physical behavior of the model 230 of the portion of the continuous web of diaper materials 231 being folded by the folding apparatus 355, during a particular period of time. The simulation of the fourth step 884 can, in some embodiments, include simulating the physical behavior of the model 230 of the portion of the continuous web of diaper materials 231 being conveyed over the roller 352, during a particular period of time. In another embodiment of the present disclosure, the simulation of the fourth step 884 can simulate a physical behavior of a model 538 or 539 of a diaper trim material 518 or 519 interacting with a model of a portion of a trim removal apparatus 660 and moving through a model 775 of the air 776, 778, 779, during a particular period of time.

The method 880 includes a fifth step 885 of evaluating the simulation of the fourth step 884. The evaluating can qualitatively and/or quantitatively evaluate any aspect of the physical behavior of any part or parts or some or all of the models being simulated. The evaluating can be performed by using computer data, measurements, or analysis, and/or by using information gained by human observation of the simulation. As an example, the evaluating can determine a particular period of time for a physical behavior to occur or not occur in the simulation. As further examples, the evaluating can evaluate a size, shape, orientation, or any other physical characteristic of any part or parts or some or all of the models being simulated at any time in the simulation. As still further examples, the evaluating can evaluate a force, pressure, velocity, or any other physical constraint of any part or parts or some or all of the models being simulated at any time in the simulation. In some embodiments of a method of simulating a physical behavior of a diaper and/or diaper materials in a diaper manufacturing process, the fifth step 885 may be omitted.

The method 880 includes a sixth step 886 of modifying one or more of the models used in the simulation of the fourth step 884. In various embodiments, the modifying can be based on the evaluation of the fifth step 885. In some embodiments of a method of simulating a physical behavior of a diaper and/or diaper materials in a diaper manufacturing process, the sixth step 886 may be omitted.

After the sixth step 886 is performed, the method 880 can be considered to be complete, or, optionally, some or all of the steps in the method 880 can be repeated. In other words, the method 880 can be performed as a single iteration or as multiple iterations. As an example, after the sixth step 886 is performed, the simulation of the fifth step 885 can be repeated, with one or more modified models, in order to evaluate the effect of any modifications, as will be understood by one of ordinary skill in the art.

Thus, the present disclosure includes methods of simulating the physical behavior of one or more diapers and/or diaper materials interacting with diaper machines and moving through surrounding air. Embodiments of the present disclosure can at least assist in predicting whether or not a particular diaper machine design can successfully process a particular configuration of a diaper and/or diaper materials. As a result, particular diaper machine designs and particular configurations of diapers and/or diaper materials can be evaluated and modified as computer based models before they are tested as real world things.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of simulation, comprising:
creating a computer based model of a portion of a continuous web of diaper materials, wherein the portion of the continuous web of diaper materials includes:
a sheet-like series of partially formed, connected diapers, wherein each of the diapers includes a chassis and an absorbent core; and
a leading edge with a rigid middle portion, a rigid trailing edge, and a flexible middle portion held in tension between the leading edge and the rigid trailing edge;
creating a computer based model of at least a portion of a diaper converting machine, wherein the diaper converting machine is configured to convert a continuous web of diaper materials into individual diapers, and wherein the portion of the diaper converting machine is configured to physically interact with the portion of the continuous web of diaper materials;
creating a computer based model of air, including:
a first volume of air completely surrounding the portion of the continuous web of diaper materials and at least part of the portion of the diaper converting machine, wherein the first volume of air is configured to allow pressure variations and to allow air exchanges with a second volume; and
the second volume of air substantially surrounding the first volume of air, wherein the second volume of air is configured at a particular constant pressure that is about equal to an atmospheric pressure; and
simulating a physical behavior of the model of the portion of the continuous web of diaper materials interacting with the model of the portion of the diaper converting machine and moving through the model of the air, during a particular period of time.

2. The method of claim 1, including:
evaluating the physical behavior of the model of the portion of the continuous web of diaper materials;
modifying the model of the portion of the continuous web of diaper materials, based on the evaluation of the physical behavior, to form a modified computer based model of the portion of the continuous web of diaper materials; and
simulating a physical behavior of the modified model of the portion of the continuous web of diaper materials interacting with the model of the portion of the diaper converting machine and moving through the model of the air, during a particular period of time.

3. The method of claim 1, including:
evaluating the physical behavior of the model of the portion of the continuous web of diaper materials;
modifying the model of the portion of the diaper converting machine, based on the evaluation of the physical behavior, to form a modified computer based model of the portion of the diaper converting machine; and
simulating a physical behavior of the model of the portion of the continuous web of diaper materials interacting with the modified model of the portion of the diaper converting machine and moving through the model of the air, during a particular period of time.

4. The method of claim 1, wherein creating the computer based model of the portion of the continuous web of diaper materials includes creating a computer based model of a portion of a continuous web of diapers that includes a series of four partially formed diapers, connected together end-to-end.

5. The method of claim 1, wherein creating the computer based model of the portion of the diaper converting machine includes creating a computer based model of a portion of a diaper converting machine that includes machine elements with machine element lengths and substantially all of the machine element lengths are greater than or equal to about 1 millimeter and less than or equal to about 10 millimeters.

6. The method of claim 5, wherein creating the computer based model of the portion of the diaper converting machine includes creating a computer based model of a portion of a diaper converting machine wherein substantially all of the machine element lengths are about 5 millimeters.

7. The method of claim 1, wherein:
creating the computer based model of the portion of the diaper converting machine includes creating a computer based model of a portion of a diaper converting machine that includes machine elements with machine element lengths, wherein substantially all of the machine element lengths are about a first particular length; and
creating the computer based model of air includes creating a computer based model of air that includes air elements with air element lengths, wherein substantially all of the air element lengths are less than or equal to about twice the first particular length.

8. The method of claim 1, wherein:
creating the computer based model of the portion of the diaper converting machine includes creating a computer based model of at least a portion of a folding apparatus, wherein a contact surface of the folding apparatus is configured with a coefficient of friction of about 0.1; and
the simulating includes simulating the physical behavior of the model of the portion of the continuous web of diaper materials being folded by the model of the folding apparatus, during the particular period of time.

9. The method of claim 1, wherein:
creating the computer based model of the portion of the diaper converting machine includes creating a computer based model of a roller, wherein a contact surface of the roller is configured with a coefficient of friction of about 1.0; and
the simulating includes simulating the physical behavior of the model of the portion of the continuous web of diaper materials being conveyed over the model of the roller, during the particular period of time.

10. A method of simulation, comprising:
creating a computer based model of a diaper trim material;
creating a computer based model of at least a portion of a trim removal apparatus, including a nozzle with a nozzle entrance, wherein the trim removal apparatus is configured to physically transport the diaper trim material through the nozzle entrance using a vacuum;
creating a computer based model of air, including:
a first volume of air completely surrounding the diaper trim material and the nozzle entrance, wherein the first volume of air is modeled to allow pressure variations and to allow air exchanges with a second volume;
the second volume of air substantially surrounding the first volume of air, wherein the second volume of air is modeled at a first particular constant pressure that is about equal to an atmospheric pressure; and
a third volume of air at the nozzle entrance, wherein the third volume of air is modeled at a second pressure that is less than the atmospheric pressure; and
simulating a physical behavior of the model of the diaper trim material interacting with the model of the portion of the trim removal apparatus and moving through the model of the air, during a particular period of time.

11. The method of claim 10, wherein creating a computer based model of a diaper trim material includes creating a computer based model of a discrete piece of diaper trim material.

12. The method of claim 10, wherein creating a computer based model of a diaper trim material includes creating a computer based model of a portion of a continuous piece of diaper trim material.

13. The method of claim 10, including determining a particular period of time for the model of the diaper trim material to move through the model of the air and through the nozzle entrance of the model of the portion of the trim removal apparatus, based on the physical behavior.

14. The method of claim 10, including:
evaluating the physical behavior of the model of the diaper trim material;
modifying the model of the portion of the trim removal apparatus, based on the evaluation of the physical behavior, to form a modified computer based model of the portion of the trim removal apparatus; and
simulating a physical behavior of the model of the diaper trim material interacting with the modified model of the portion of the trim removal apparatus and moving through the model of the air, during a particular period of time.

15. The method of claim 14, wherein the evaluating includes evaluating a size of the nozzle entrance.

16. The method of claim 14, wherein the evaluating includes evaluating a shape of the nozzle entrance.

17. The method of claim 14, wherein the evaluating includes evaluating a value for the second particular constant pressure.

18. The method of claim 14, wherein the evaluating includes evaluating a shape of the diaper trim material as it moves.

19. A computer readable medium having instructions for causing a device to perform a method, the method comprising:
providing a computer based model of a portion of a continuous web of diaper materials, wherein the portion of the continuous web of diaper materials includes:
a sheet-like series of partially formed, connected diapers, wherein each of the diapers includes a chassis and an absorbent core; and
a leading edge with a rigid middle portion, a rigid trailing edge, and a flexible middle portion held in tension between the leading edge and the rigid trailing edge;
providing a computer based model of at least a portion of a diaper converting machine, wherein the diaper converting machine is configured to convert a continuous web of diaper materials into individual diapers, and wherein the portion of the diaper converting machine is configured to physically interact with the portion of the continuous web of diaper materials;
providing a computer based model of air, including:
a first volume of air completely surrounding the portion of the continuous web of diaper materials and at least part of the portion of the diaper converting machine, wherein the first volume of air is configured to allow pressure variations and to allow air exchanges with a second volume; and
the second volume of air substantially surrounding the first volume of air, wherein the second volume of air is configured at a particular constant pressure that is about equal to an atmospheric pressure; and
simulating a physical behavior of the model of the portion of the continuous web of diaper materials interacting with the model of the portion of the diaper converting machine and moving through the model of the air, during a particular period of time.

20. A computer readable medium having instructions for causing a device to perform a method, the method comprising:
providing a computer based model of a diaper trim material;
providing a computer based model of at least a portion of a trim removal apparatus, including a nozzle with a nozzle entrance, wherein the trim removal apparatus is configured to physically transport the diaper trim material through the nozzle entrance using a vacuum;

providing a computer based model of air, including:

a first volume of air completely surrounding the diaper trim material and the nozzle entrance, wherein the first volume of air is modeled to allow pressure variations and to allow air exchanges with a second volume;

the second volume of air substantially surrounding the first volume of air, wherein the second volume of air is modeled at a first particular constant pressure that is about equal to an atmospheric pressure; and a third volume of air at the nozzle entrance, wherein the third volume of air is modeled at a second particular constant pressure that is less then the atmospheric pressure; and simulating a physical behavior of the model of the diaper trim material interacting with the model of the portion of the trim removal apparatus and moving through the model of the air, during a particular period of time.

21. A method of simulation, comprising:

creating a computer based model of a portion of a continuous web of disposable article materials, wherein the portion of the continuous web of disposable article materials includes:

a sheet-like series of partially formed, connected disposable articles; and a leading edge with a rigid middle portion, a rigid trailing edge, and a flexible middle portion held in tension between the leading edge and the rigid trailing edge;

creating a computer based model of at least a portion of a disposable article converting machine, wherein the disposable article converting machine is configured to convert a continuous web of disposable article materials into individual disposable articles, and wherein the portion of the disposable article converting machine is configured to physically interact with the portion of the continuous web of disposable article materials;

creating a computer based model of air, including:

a first volume of air completely surrounding the portion of the continuous web of disposable article materials and at least part of the portion of the disposable article converting machine, wherein the first volume of air is configured to allow pressure variations and to allow air exchanges with a second volume; and the second volume of air substantially surrounding the first volume of air, wherein the second volume of air is configured at a particular constant pressure that is about equal to an atmospheric pressure; and simulating a physical behavior of the model of the portion of the continuous web of disposable article materials interacting with the model of the portion of the disposable article converting machine and moving through the model of the air, during a particular period of time.

22. A method of simulation, comprising:

creating a computer based model of a disposable article trim material;

creating a computer based model of at least a portion of a trim removal apparatus, including a nozzle with a nozzle entrance, wherein the trim removal apparatus is configured to physically transport the disposable article trim material through the nozzle entrance using a vacuum;

creating a computer based model of air, including:

a first volume of air completely surrounding the disposable article trim material and the nozzle entrance, wherein the first volume of air is modeled to allow pressure variations and to allow air exchanges with a second volume;

the second volume of air substantially surrounding the first volume of air, wherein the second volume of air is modeled at a first particular constant pressure that is about equal to an atmospheric pressure; and a third volume of air at the nozzle entrance, wherein the third volume of air is modeled at a second pressure that is less than the atmospheric pressure; and simulating a physical behavior of the model of the disposable article trim material interacting with the model of the portion of the trim removal apparatus and moving through the model of the air, during a particular period of time.

* * * * *

UNITED STATES PATENT AND TRADEMARK OFFICE
CERTIFICATE OF CORRECTION

| | | |
|---|---|---|
| PATENT NO. | : 7,877,242 B2 | Page 1 of 1 |
| APPLICATION NO. | : 11/959986 | |
| DATED | : January 25, 2011 | |
| INVENTOR(S) | : Jean Vittorio Seguro et al. | |

It is certified that error appears in the above-identified patent and that said Letters Patent is hereby corrected as shown below:

On title page, item [56]

IN THE OTHER PUBLICATIONS
    Line 5, delete "Mechanis" and insert --Mechanics--.

In the Specification

Column 3
    Line 10, delete "CED" and insert --CFD--.

Signed and Sealed this
Twenty-fourth Day of September, 2013

Teresa Stanek Rea
*Deputy Director of the United States Patent and Trademark Office*